US006988824B2

(12) United States Patent
Santospago et al.

(10) Patent No.: US 6,988,824 B2
(45) Date of Patent: Jan. 24, 2006

(54) FLUID MIXING APPARATUS ADAPTER BUCKET

(75) Inventors: Joanne Santospago, Francestown, NH (US); Carlos P. Salas, Charlotte, NC (US)

(73) Assignee: Ultrablend Color, LLC, Charlotte, NC (US)

( * ) Notice: Subject to any disclaimer, the term of this patent is extended or adjusted under 35 U.S.C. 154(b) by 0 days.

(21) Appl. No.: 10/944,257

(22) Filed: Sep. 17, 2004

(65) Prior Publication Data

US 2005/0030834 A1 Feb. 10, 2005

Related U.S. Application Data

(63) Continuation of application No. 10/201,148, filed on Jul. 23, 2002, now abandoned.

(51) Int. Cl.
*G11B 7/00* (2006.01)

(52) U.S. Cl. ...................... 366/217; 366/209; 366/605; 220/737

(58) Field of Classification Search ........ 366/208–217, 366/219, 605; 220/737, 23.4, 23.89, 23.91
See application file for complete search history.

(56) References Cited

U.S. PATENT DOCUMENTS

| | | | | |
|---|---|---|---|---|
| 2,709,540 | A | 5/1955 | Kenney | 222/126 |
| 4,235,553 | A | 11/1980 | Gall | 366/208 |
| 4,497,581 | A | 2/1985 | Miller | 366/208 |
| 5,788,371 | A | 8/1998 | Neri et al. | 366/217 |
| 5,799,820 | A | 9/1998 | Maas | 220/739 |
| 6,193,410 | B1 | 2/2001 | Puckett, II | 366/348 |
| 6,767,125 | B2 * | 7/2004 | Midas et al. | 366/209 |
| 6,767,126 | B2 * | 7/2004 | Miller | 366/217 |
| 2003/0107949 | A1 | 6/2003 | Huckby et al. | 366/217 |
| 2003/0142583 | A1 | 7/2003 | Santospag et al. | 366/209 |
| 2003/0179646 | A1 | 9/2003 | Miller | 366/217 |
| 2003/0214878 | A1 | 11/2003 | Huckby | 366/217 |
| 2004/0085855 | A1 * | 5/2004 | Midas et al. | 366/209 |
| 2004/0141412 | A1 * | 7/2004 | Midas et al. | 366/217 |
| 2004/0208083 | A1 * | 10/2004 | Armendariz et al. | 366/209 |
| 2004/0240314 | A1 * | 12/2004 | Armendariz et al. | 366/209 |
| 2005/0002273 | A1 * | 1/2005 | Huckby et al. | 366/217 |
| 2005/0030834 | A1 * | 2/2005 | Santospago et al. | 266/209 |
| 2005/0088910 | A1 * | 4/2005 | Greco et al. | 366/209 |
| 2005/0141341 | A1 * | 6/2005 | Greco et al. | 366/209 |
| 2005/0195685 | A1 * | 9/2005 | Marshall et al. | 366/217 |

FOREIGN PATENT DOCUMENTS

| | | |
|---|---|---|
| CA | 2428185 | * 11/2003 |
| JP | 61-161128 | * 7/1986 |
| JP | 8-38871 | 2/1996 |

* cited by examiner

OTHER PUBLICATIONS

Sherwin-Williams Photos 1-3.

*Primary Examiner*—Charles E. Cooley
(74) *Attorney, Agent, or Firm*—Kennedy Covington Lobdell & Hickman, LLP

(57) ABSTRACT

An improved adapter bucket for a mixing apparatus adapted for mixing paints or other fluids can selectively receive either conventional cylindrical containers or non-conventional, non-cylindrical containers therein and restrain either of such container types on the apparatus during mixing operations. The adapter bucket is configured to properly register either of such containers types so that its center of gravity axis is colinearly aligned with the rotation axis of the bucket and the mixing apparatus, regardless of whether the containers' center of gravity axes and central geometric axes are coincident and colinear with each other or laterally offset with respect to each other.

28 Claims, 9 Drawing Sheets

FLUID MIXING APPARATUS ADAPTER BUCKET

This application is a continuation of U.S. application Ser. No. 10/201,148 filed Jul. 23, 2002, now abandoned, for FLUID MIXING APPARATUS MIXING BUCKET.

BACKGROUND AND SUMMARY OF THE INVENTION

The present invention relates generally to apparatuses for mixing fluids, such as paints, for example, in containers placed in bucket-type receptacles on such mixing apparatuses, and more particularly to buckets adapted to selectively receive containers of different shapes and to register such containers in properly balanced positions.

Paints or other fluids are typically mixed or blended into homogenous mixtures while in the same cylindrical containers in which they are shipped, stored, sold, and ultimately dispensed by the user. An example of the need for such in-container mixing results from colorants or pigments being added to base paints. In order to properly position and restrain these cylindrical containers, the mixing apparatuses typically include cylindrical receptades or "buckets" into which the containers are inserted. Such cylindrical buckets are frequently mounted and positioned on their mixing apparatuses for balanced spinning or rotating motion about the mixing apparatuses' rotation axes, which extend internally through the centers of the bases of these buckets, and for simultaneous "planetary" revolution about external revolution axes that may or may not be parallel to the internal rotation axes. Such cylindrical buckets can also be mounted and positioned on their mixing apparatuses for other balanced motion about the other mixing apparatuses' motion axes, which also extend internally through the buckets.

The typical paint cylindrical container has its "central geometric axes" extending perpendicularly through the center of its circular base such that the radially outer periphery of the cylindrical container is geometrically symmetrical with respect to such central geometric axis. Such a container also has an internal "center of gravity axis" extending through the container's center of gravity and about which the container is balanced when rotated. Because the container is symmetrical, the central geometric axis and the center of gravity axis are coincident and colinear. Therefore, such cylindrical containers are properly balanced when received within the correspondingly cylindrical buckets described above because their center of gravity axes are properly aligned and colinear with the rotation axes of the mixing apparatuses.

Recently, however, at least one paint manufacturer has introduced a paint can or container that is non-cylindrical, with a substantially square lateral cross-sectional shape and radiused corners. This so-called "square container" also has a partial cut-out handle portion at one corner to form an integral handle at an intermediate longitudinal height between the container's base portion and top portion. Because of this configuration with its handle and cut-out portion, and the resultant lateral displacement of paint, the square container's center of gravity does not lie on its central geometric axis. This results in its center of gravity axis being laterally or radially offset relative to its central geometric axis which extends perpendicularly through the center of its substantially square base and is laterally centered with respect to the laterally outer confines of the space occupied by the square container. Thus, such a square container typically cannot be received within the conventional cylindrical bucket of a mixing apparatus. Even if the bucket's shape was changed to a square lateral cross-section, the square container would be rotationally unbalanced if its central geometric axis were coincident and colinear with the rotation axis of the conventional cylindrical bucket. Such weight imbalance would result in damage, or at least undue and premature wear, to the motion transmission mechanisms and components of the mixing apparatus.

In order to accommodate both the conventional cylindrical containers and the new square containers, the above-described mixing apparatuses would have to be equipped with interchangeable conventional cylindrical buckets and "square buckets", each appropriately shaped and configured to properly align its corresponding container's center of gravity axis with the rotation axis of the mixing apparatus. In addition, besides duplicating bucket costs and resulting in undue inconvenience in the storage of multiple buckets, such an arrangement would require either the provision of multiple mixing apparatuses at a given site or the inordinately time-consuming dismounting of one bucket and remounting of another bucket each time a single mixing apparatus is to be used for a container having a shape and configuration different from that of the container for which the mixing apparatus was last used.

The present invention seeks to over come these disadvantages by providing a single mixing apparatus bucket that is adapted to receive and restrain either cylindrical containers or non-cylindrical containers and that properly registers either of such containers so that its center of gravity axis is colinearly aligned with the rotation axis of the bucket and the mixing apparatus.

According to the present invention, an adapter bucket is provided for a mixing apparatus for mixing a fluid in a fluid container, with the mixing apparatus including a motion axis about which the container is moved by the mixing apparatus. The adapter bucket is mountable on the mixing apparatus for receiving and restraining either a first container having its center of gravity axis coincident with its central geometric axis or a second container having its center of gravity axis offset with respect to its central geometric axis. The adapter bucket preferably includes a generally cup-shaped body for receiving said selected container therein, with the body including a base through which the motion axis of the mixing apparatus extends when said adapter is mounted on the mixing apparatus and a number of adapter sides extending or protruding transversely, upwardly from the base. The selected container is positioned with its center of gravity axis along the apparatus' motion axis when the selected container is received within the adapter between the adapter sides regardless of whether the selected container is the first container or the second container.

The adapter bucket is especially well adapted for accommodating situations where the above-mentioned first container has a generally circular lateral cross-sectional shape with a generally cylindrical first container side, and the second container has a generally polygonal lateral cross-sectional shape with a number of substantially straight container sides. Preferably internal partial walls or tabs protruding transversely, generally upwardly, from the base of the adapter bucket act as restraining members to tangentially engage and laterally restrain the first (cylindrical) container when the first container is received within said adapter, and spring dips or pivotal tabs restrain the container vertically. A number (only two in the exemplary embodiment described herein) of the adapter bucket's upwardly protruding sides generally flatly engage and act as restraining members to laterally restrain the second ("square")

container's sides when the second container is received within said adapter, with the other two of the adapter bucket's sides preferably being spaced apart from a corresponding or adjacent pair of the second container's sides when the second container is received within the adapter bucket In the preferred exemplary embodiment described herein, the adapter bucket includes an intermediate adapter bucket side or corner interconnecting the adapter bucket sides that are spaced apart from the second container sides, with this intermediate side or corner portion tangentially engaging a portion (preferably a corner portion) of the second container when the second container is received within the adapter bucket. In the preferred, exemplary embodiment described herein, this is accomplished by way of this intermediate side or corner portion of the adapter bucket being formed as a radiused corner having a larger (and therefore shallower) radius than the other three radiused corners of the adapter bucket. This results in the spaced apart adapter bucket sides and the central geometric axis of the second container being on opposite sides of the motion (rotation) axis of the bucket (and thus of the mixing apparatus) when the second ("square") container is received in its offset position within the adapter bucket.

Because of this unique configuration, a conventional fluid container can be inserted into the adapter bucket and be properly centered, aligned and balanced for mixing, as usual in the prior art. However, according to the present invention, the same bucket (called the "adapter" or "adapter bucket" herein) can also interchangeably accommodate the non-conventional so-called "square containers," with their cut-out handle portions at one side or one corner laterally displacing a portion of the fluid in the container and thus shift its center of gravity axis laterally away from its central geometrical axis. The adapter bucket of the present invention urges the non-cylindrical container in a lateral direction, as mentioned above, generally towards the cut-out handle portion in order to colinearly align the container's center of gravity axis with the rotation axis of the bucket and the mixing apparatus and properly balance the container. This lateral shifting is accomplished as a result of the larger radiused corner of the adapter bucket having a larger radius than that of the other three corners, as described above, and tangentially engaging a radiused corner on the so-called square container to cause the square container to be shifted laterally in a direction toward the container's cut-out handle portion, thus compensating for the lateral difference between the square container's central geometrical axis and its center of gravity axis.

Preferably, visual or other indicators are provided on the adapter bucket in order to allow the user to properly orient the square container when inserting it into the adapter bucket so that the center of gravity axis of the container can be properly aligned colinearly with the rotation axis of the mixing apparatus. In addition, other orienting configurations can be included on the adapter bucket, such as one or more laterally inwardly protruding "dimples" or other protrusions from its sides so that such protrusion can engage the cut-out portion of the square container. Still other well known orienting, registering or "detent" features will occur to those skilled in the art to assure proper insertion of the or other non-cylindrical containers that have a center of gravity axis offset relative to their central geometrical axes.

Other objects, advantages and features of the present invention, in addition to those examples mentioned above, will become apparent from the following description and the appended claims, taken in conjunction with the accompanying drawings.

DESCRIPTION OF THE PREFERRED EMBODIMENTS

FIGS. 1 through 13 of the accompanying drawings depict various merely exemplary embodiments of a mixing apparatus adapter bucket according to the present invention. Such illustrations are shown for purposes of illustration herein as being applicable in mixing apparatuses adapted for mixing paints in the containers in which they are shipped, stored, sold, and ultimately dispensed by the user. One skilled in the art will readily recognize, however, that other embodiments according to the invention can also be employed in such mixing apparatuses and that the invention can be equally and advantageously used in other types of mixing apparatus, in applications adapted for mixing other fluids, or in applications intended for mixing fluids in other types of dissimilar containers.

Figure 1:
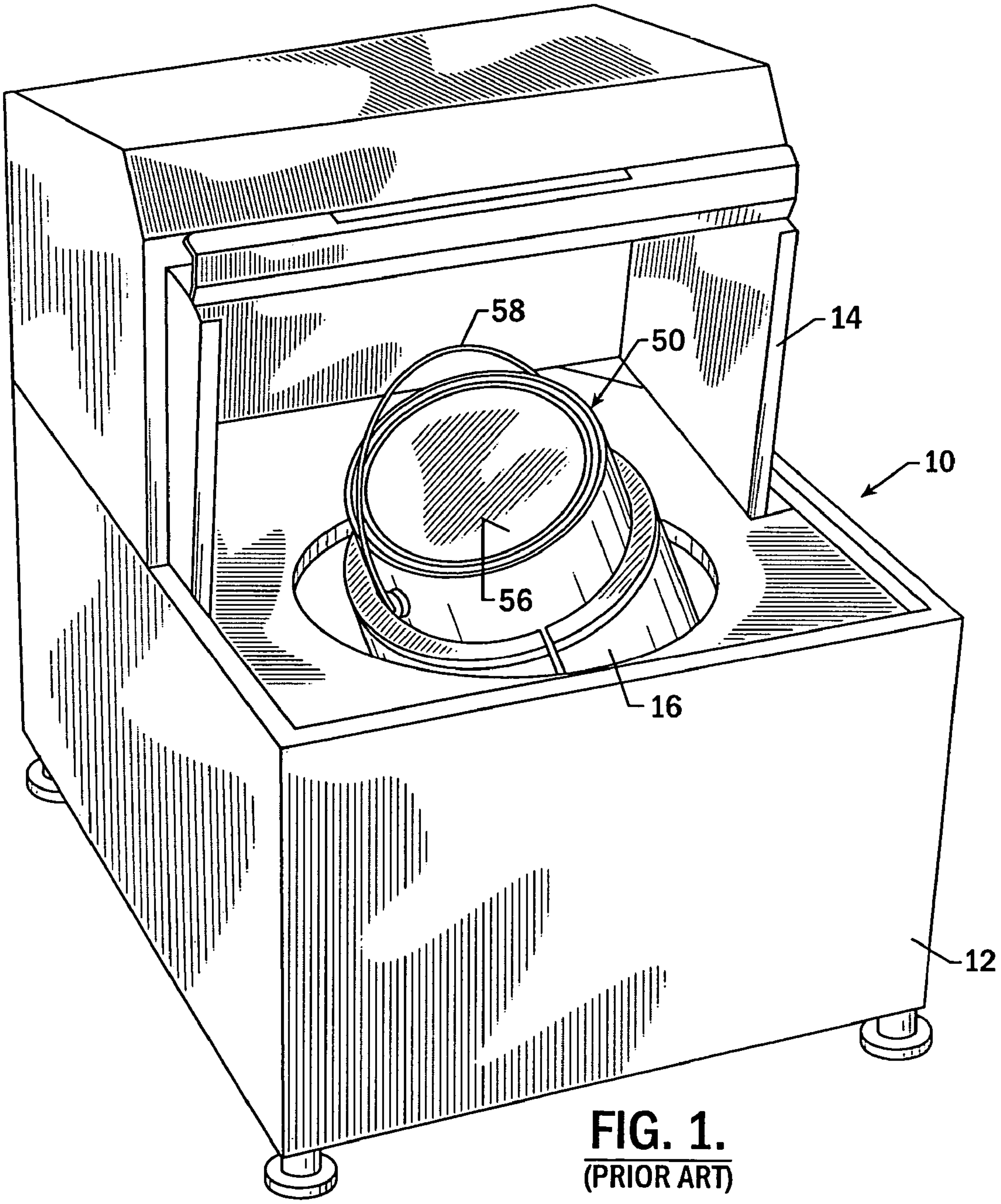
FIG. 1. (PRIOR ART)
FIG. 1 is a perspective view of a prior art paint mixing apparatus, illustrating a conventional cylindrical paint container received and restrained within a conventional bucket mounted on the mixing apparatus.
Figure 2:
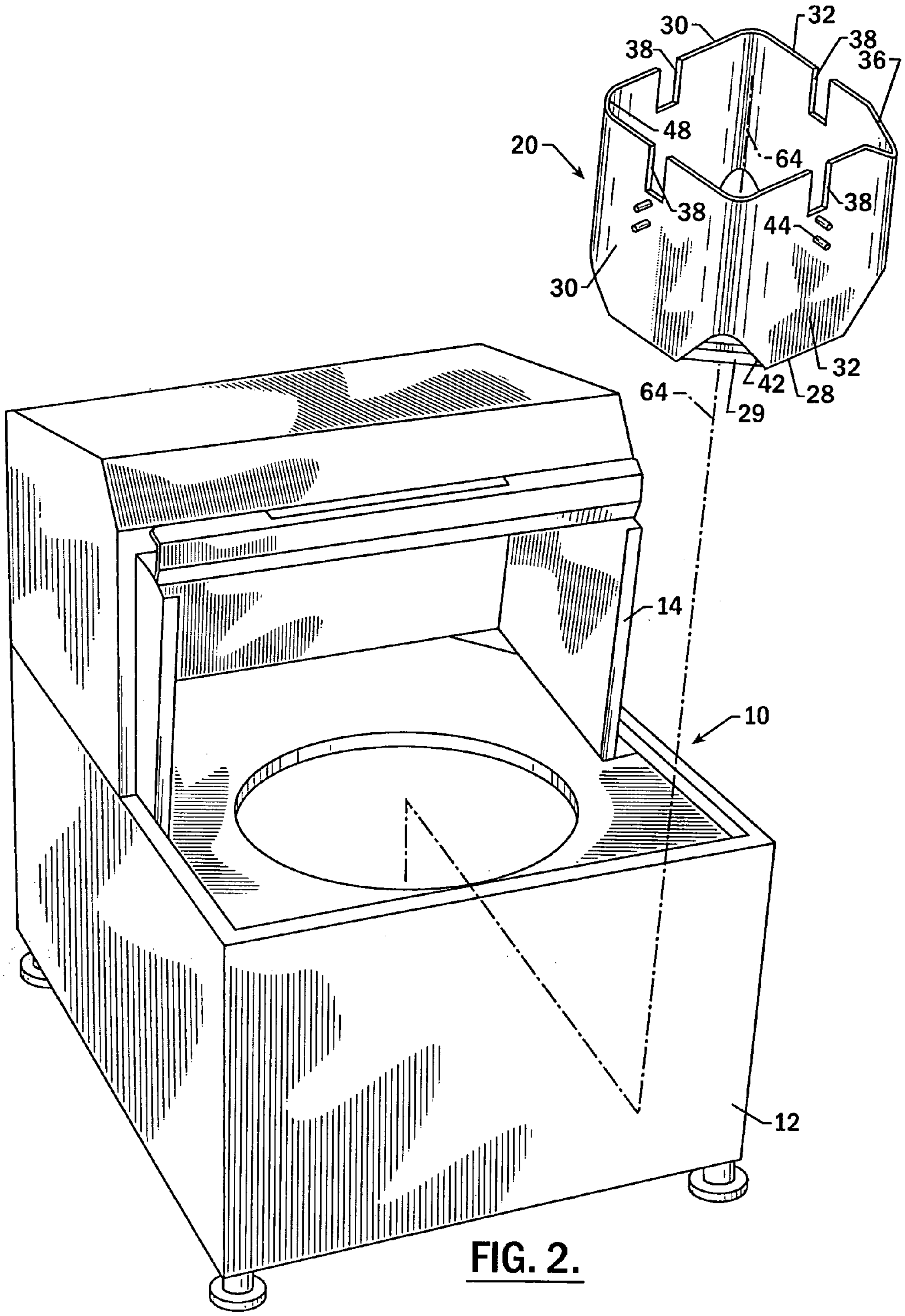
FIG. 2 is a perspective view similar to that of FIG. 1, but illustrating an exemplary preferred embodiment of an adapter bucket according to the present invention removed from the mixing apparatus for purposes of clarity.
Figure 3:
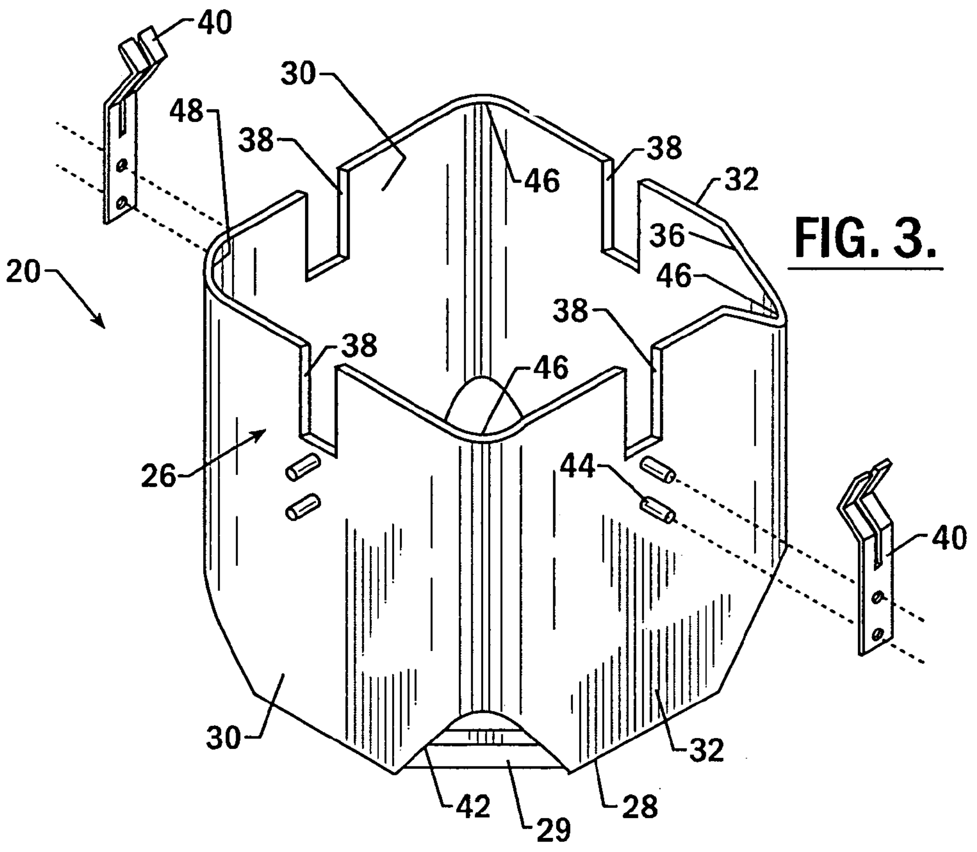
FIG. 3 is a perspective view of the adapter bucket shown in FIG. 2.
Figure 6:
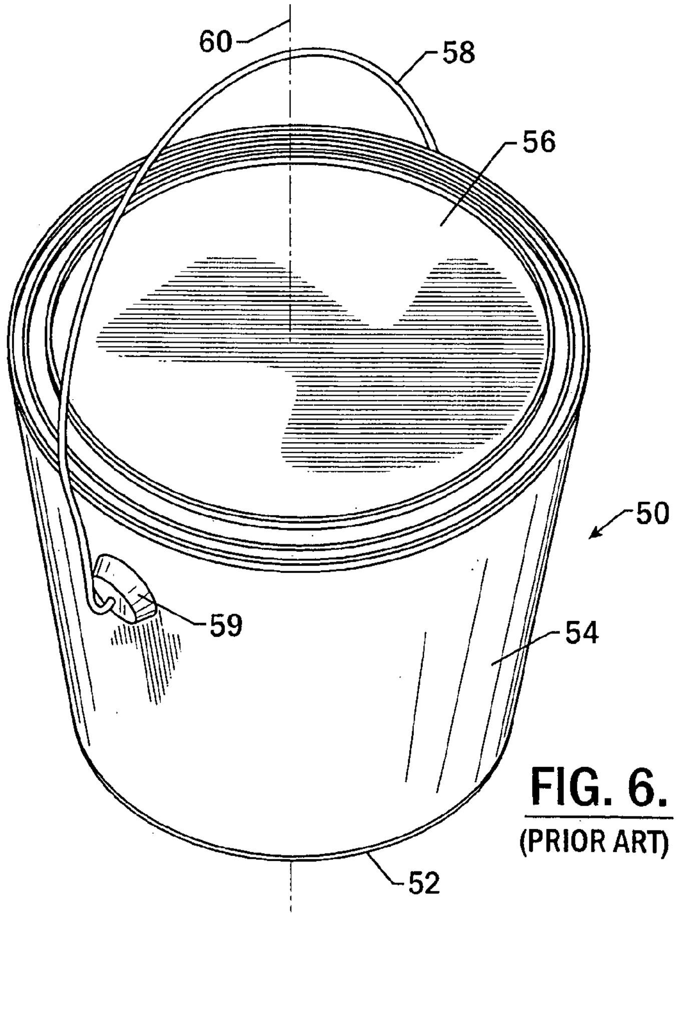
FIG. 6. (PRIOR ART)
FIG. 6 is a perspective view of a conventional cylindrical paint container.

Referring initially to FIG. 1, a conventional mixing apparatus 10 includes a cabinet 12 with a closeable door 14 surrounding a mixing area of the machine. A conventional bucket 16 is mounted on the mixing apparatus 10 and is adapted for receiving a conventional paint container 50, having a base 52, a cylindrical side 54, a lid 56, and a handle or bail 58 pivotally secured by the ferrules 59, as is also illustrated in FIG. 6. The mixing apparatus 10 typically includes a rotation axis 64, (see FIGS. 2 and 4), about which the bucket 16 and the cylindrical paint container 50 are rotated or spun, as well as an conventional external revolution axis (not shown) about which the bucket 16 and the paint container 50 can be revolved in a planetary manner.

Figure 7:
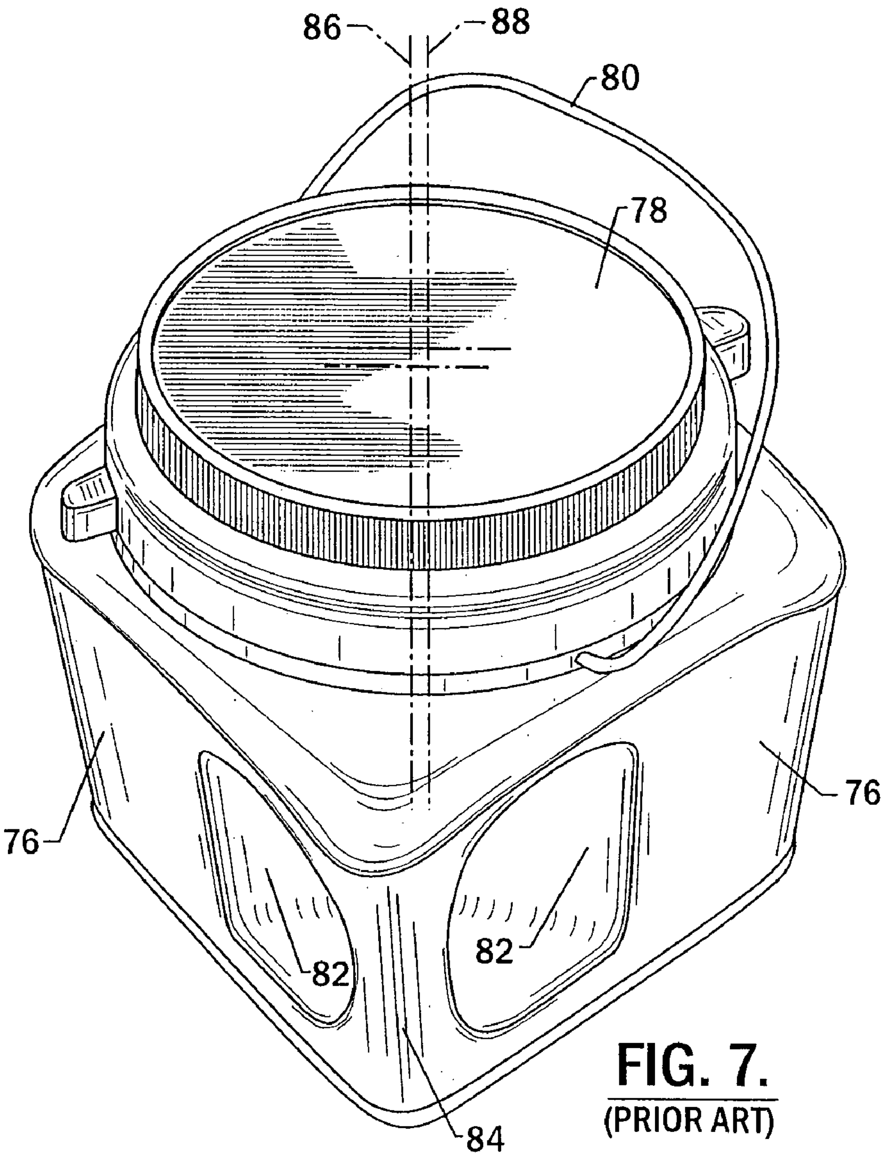
FIG. 7. (PRIOR ART)
FIG. 7 is a top perspective view of a non-cylindrical paint container.
Figure 8:
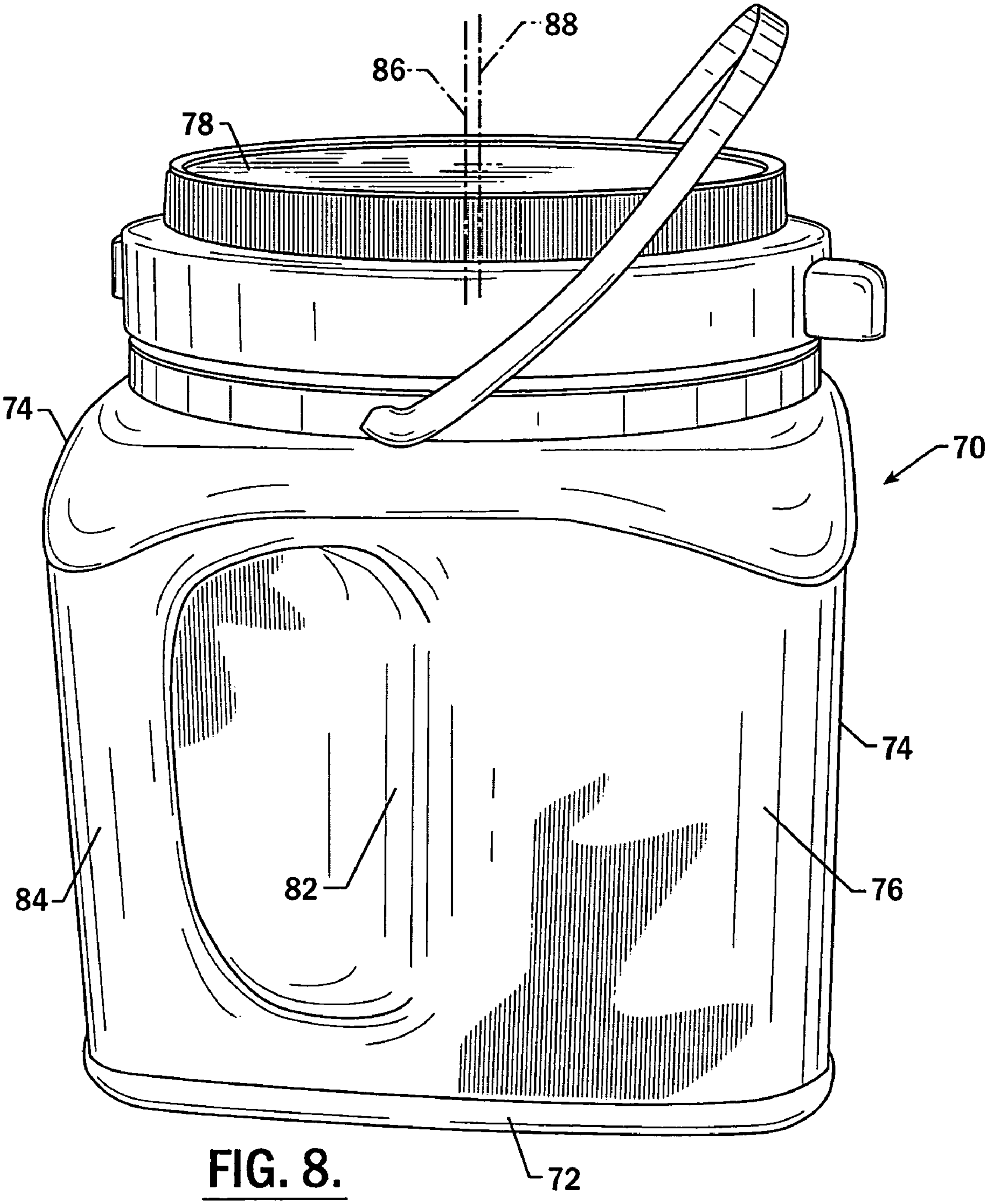
FIG. 8 is a side view of the non-cylindrical paint container of FIG. 7.
Figure 9:
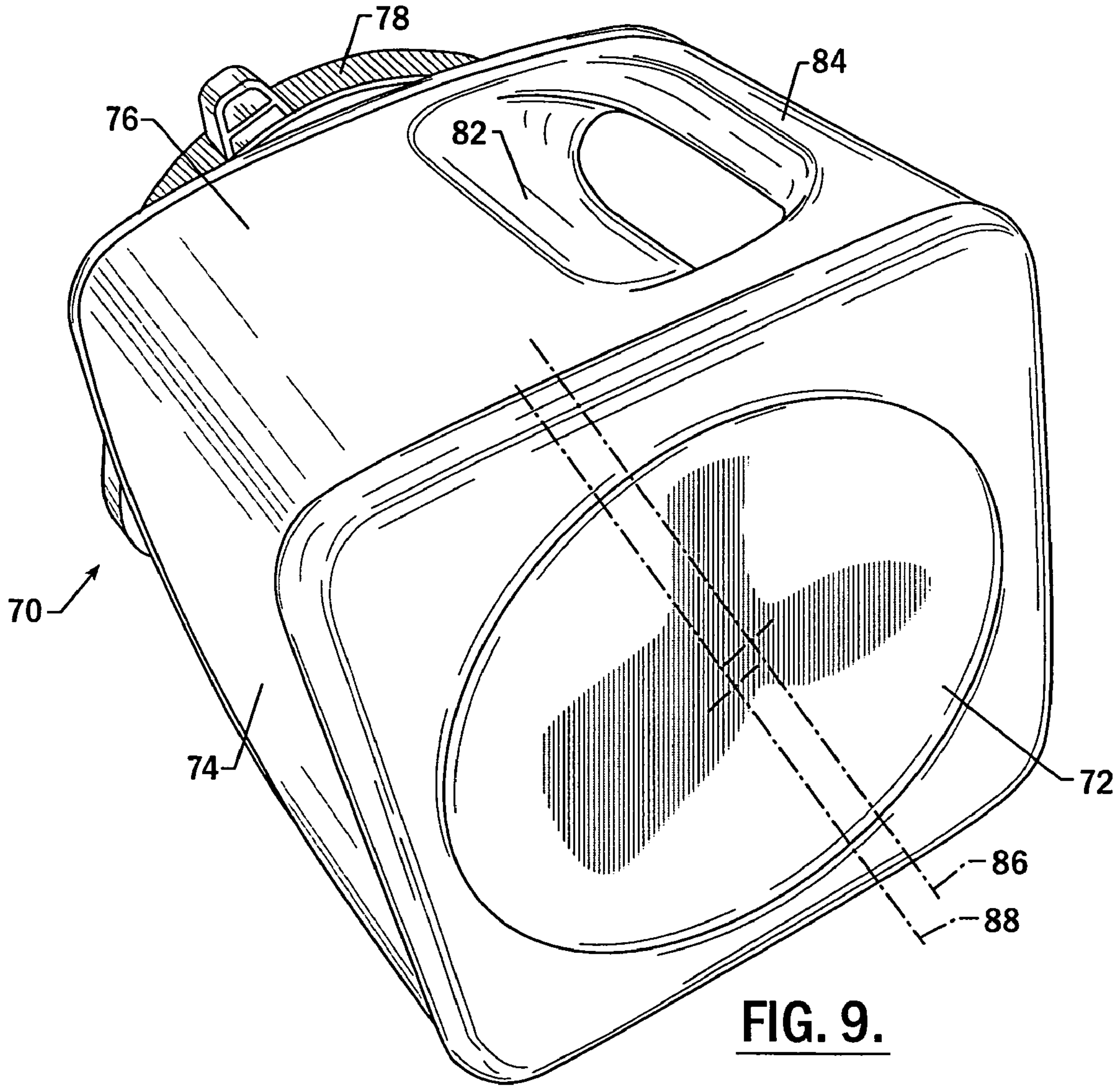
FIG. 9 is a bottom perspective view of the non-cylindrical paint container of FIGS. 7 and 8.

Although the conventional mixing apparatus 10, with the conventional bucket 16 are well-suited for receiving and restraining the conventional paint container 50 during mixing operations, at least one paint manufacturer has recently introduced non-cylindrical paint containers, including those having a generally square lateral cross-sectional shape and with a cut-out handle portion at one corner or one side, as is illustrated in FIGS. 7 through 9 and discussed in more detail below.

FIGS. 2 through 5 illustrate an adapter bucket 20, according to the present invention, and an angled control member or assembly 22, which imparts parts mixing motion to the adapter bucket 20 when mounted on the mixing apparatus 10. The exemplary adapter bucket 20 includes a body 26 having a base 28 and generally upstanding or transversely extending sides 30 and 32. In the preferred form of the adapter bucket 20 illustrated in the drawings, the sides 32 include a locator cut-out portion 36, which serves as a visual indication to the user of the proper orientation of the square paint container 70 (illustrated in FIGS. 7 through 9), as will be discussed in more detail below.

Preferably, cut-out portions 38 for receiving resilient spring dips 40 on two (or optionally even four) sides of the adapter bucket 20. The spring clips 40 serve to restrain the handle or bail 58 and the ferrules 59 and vertically restrain the cylindrical paint container 50. The spring dips 40 can also be used to restrain the bail 80 of the square paint container 70. Such spring clips 40 can be retained in place on the adapter bucket 20 by way of pegs or pins 44, or in other conventional ways that will readily occur to those skilled in the art. The spring clips 40 can optionally be replaced by tabs pivotally attached to the sides of the adapter bucket, for example, for vertically restraining the cylindrical paint container 50.

In addition, in order to assure proper clearance with other mixing apparatus components during the mixing operation, the exemplary adapter bucket 20 can include cut-away lower corner portions 42 of the base 28, if needed.

Figure 4:
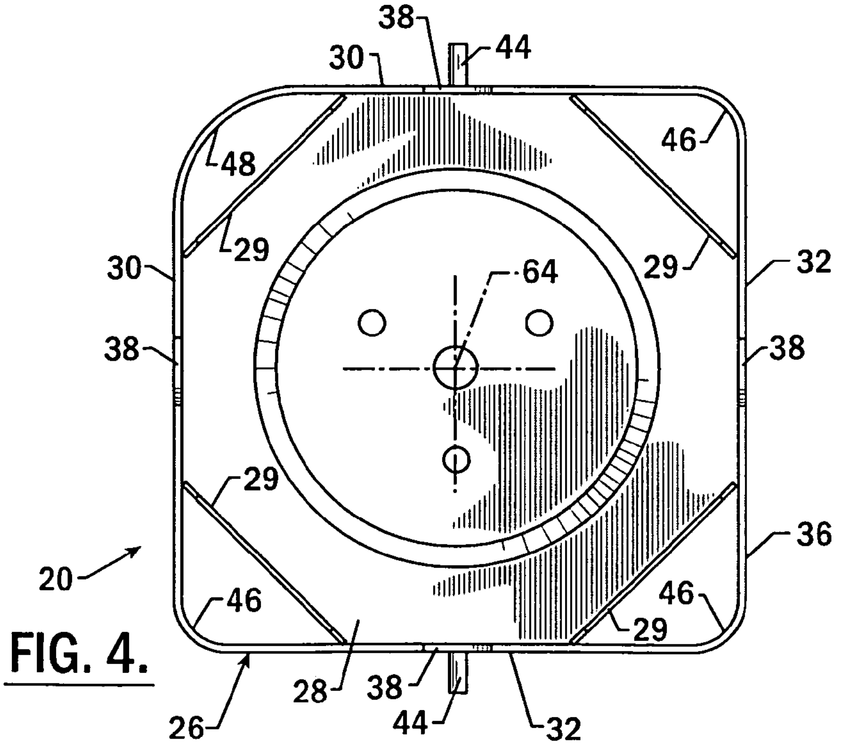
FIG. 4 is a top view of the adapter bucket of FIG. 3.
Figure 5:
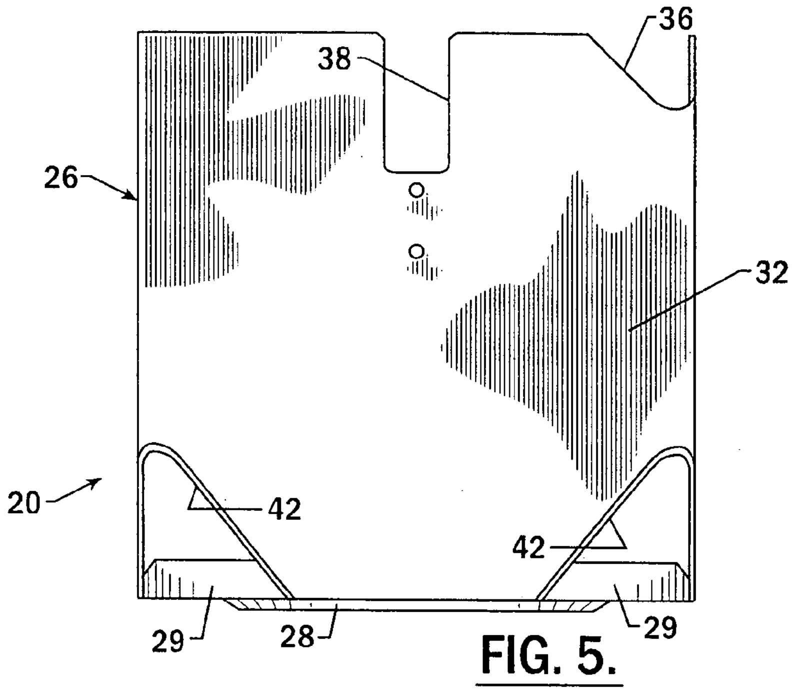
FIG. 5 is a side view of the adapter bucket of FIGS. 3 and 4.

The preferred adapter bucket 20 preferably includes a number of intermediate side wall or radiused corners 46 and 48. Referring specifically to FIG. 4, the radiused corner or side wall portion 48 has a larger radius, and its therefore "shallower", than the other three smaller-radiused corner or side portions 46. This shallower or larger-radiused corner or side portion 48 is provided for properly positioning the non-cylindrical or paint container 70, as is further discussed below.

Referring to FIGS. 7 through 9, the non-cylindrical or square paint container 70 preferably includes a base 72, as well as adjacent sides 74 and adjacent sides 76 extending transversely or upwardly from the base 72. The paint container 70 also includes a lid 78, a bail 80, and a pair of cut-out portions 82 in the side 76 in order to define an integrally formed handle 84.

Because of the provision of the cut-out portions 82 and the handle 84 in the paint container 70, a portion of the paint or other fluid in the paint container 70 is necessarily displaced laterally toward the opposite corner of the paint container 70 from the handle 84. The paint container 70 has a central geometric axis 86, which is centrally located with respect to the outer peripheral confines of the space occupied by the paint container 70, and a center of gravity axis 88, which passes through the center of gravity of a full paint container 70.

Such shifting of the center of gravity axis 88 in the paint container 70 would cause the paint container 70 to be rotationally unbalanced if its central geometric axis 86 was colinearly aligned with the rotation axis 64 of the adapter bucket 20 and the mixing apparatus 10. This weight imbalance would result in damage, or at least premature and undue wear, to the motion transmission mechanisms and components of the mixing apparatus 10.

Figure 11:
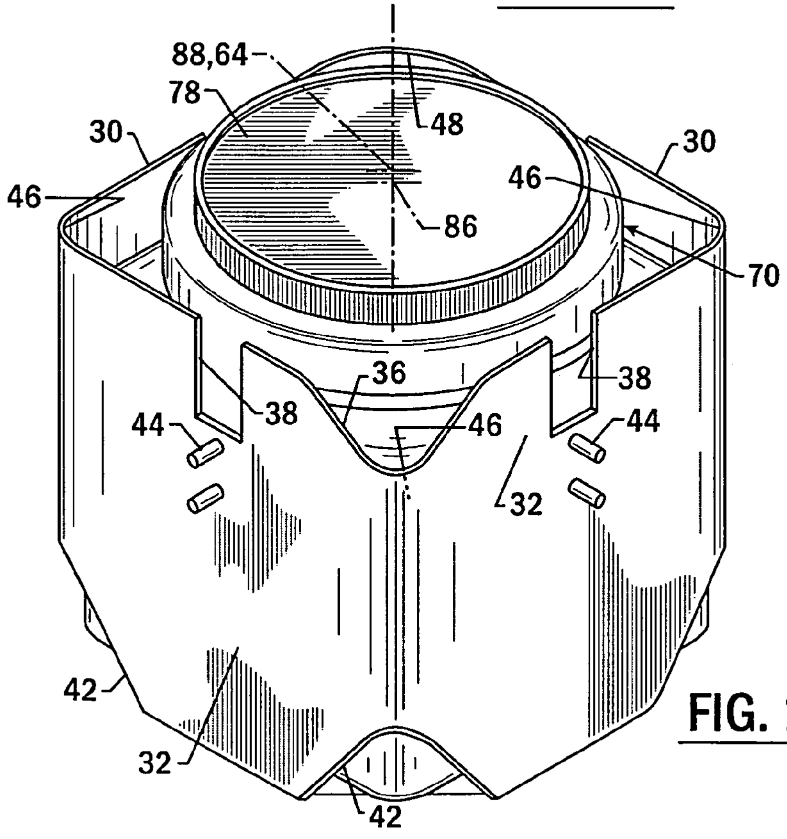
FIG. 11 is a top perspective view of the adapter bucket of FIGS. 3 through 5, with the non-cylindrical paint container's center of gravity axis offset relative to its central geometric axis but aligned with the rotation axis of the bucket.
Figure 12:
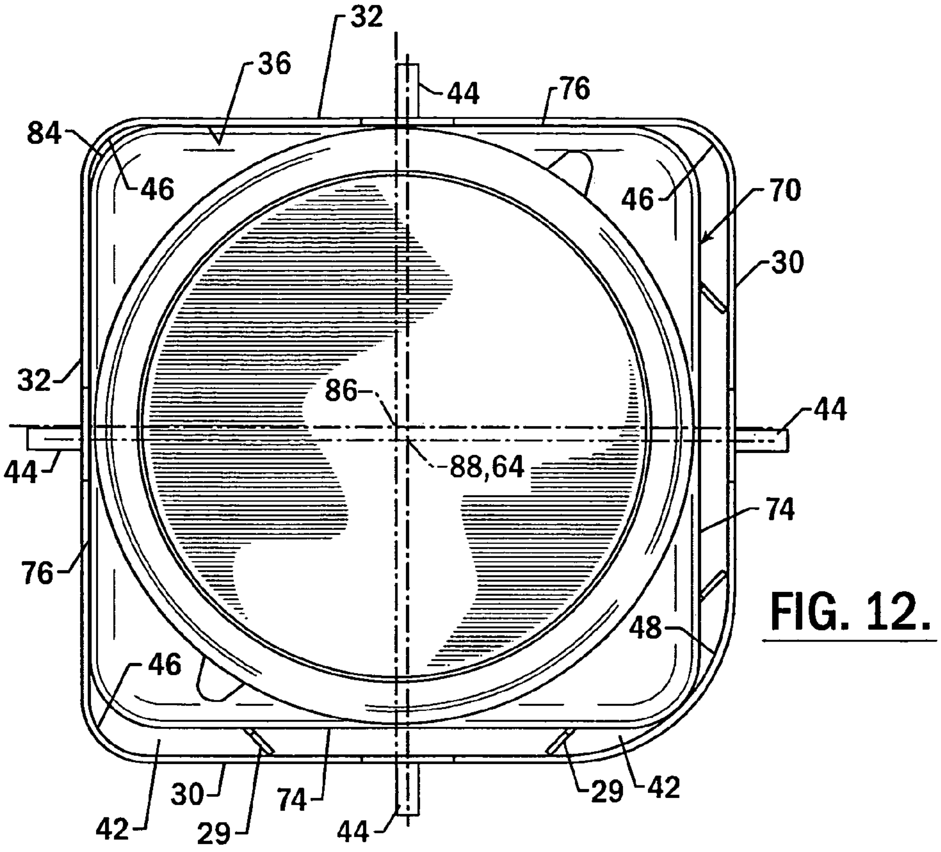
FIG. 12 is a top view of the adapter bucket of FIGS. 3 through 5, with the non-cylindrical paint container's central geometric axis laterally offset with respect to the rotation axis of the bucket, but with its center of gravity axis aligned with the rotation axis of the bucket.
Figure 13:
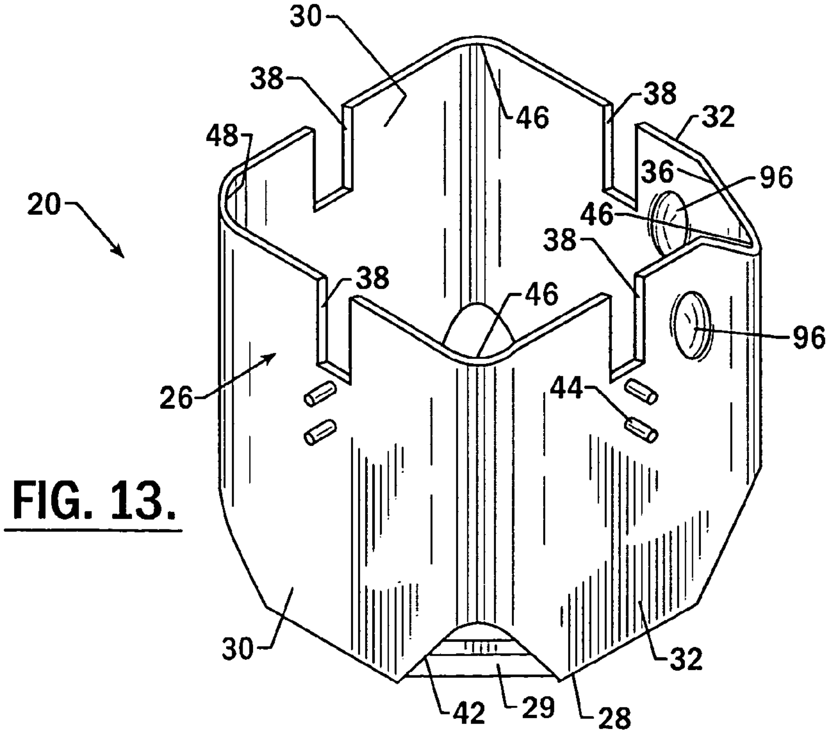
FIG. 13 is a perspective view similar to that of FIG. 2, but illustrating an alternate adapter bucket according to the present invention with inward registry protrusions for engaging handle cut-out portions of the non-cylindrical container.

Therefore, in order to accommodate such laterally offset or shifted center of gravity axis 88 of the square paint container 70, the larger-radiused corner or side portion 48 laterally restrains and urges the paint container 70 laterally toward the opposite corner of the adapter bucket 20, as is illustrated in FIGS. 11 through 12. Referring specifically to FIG. 12, this lateral shifting or offset relationship results in the condition discussed above, wherein the central geometric axis 86 of the paint container 70 and the shallower, larger-radiused corner or side portion 48 are on opposite sides of the center of gravity axis 88 of the paint container 70.

Figure 10:
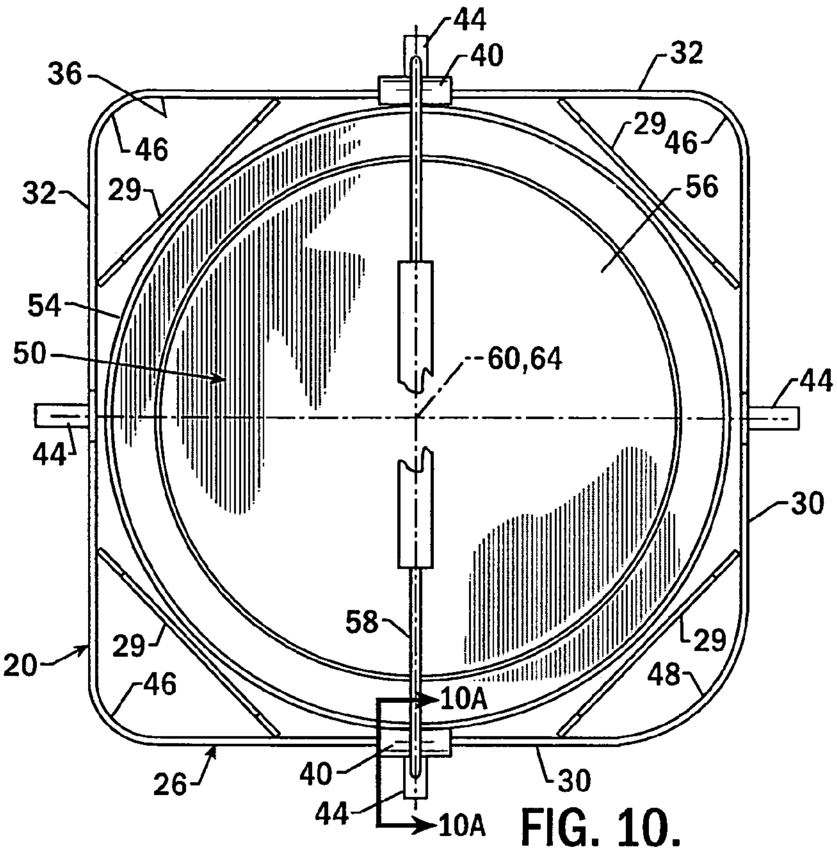
FIG. 10 is a top view of the adapter bucket of FIGS. 3 through 5, with the conventional cylindrical paint container's center of gravity axis and central geometric axis both with the rotation axis of the bucket.
Figure 10A:
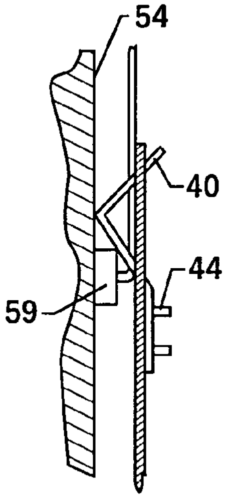
FIG. 10A is a cross-sectional view taken generally along lines 10A—10A of FIG. 10.

This arrangement also results in the adjacent sides 30, which are interconnected by the larger-radiused corner 48, being spaced apart from the sides of the paint container 70, while the adjacent sides 32 of the adapter bucket 20 generally flatly engage and laterally restrain the sides of the paint container 70. However, as shown in FIG. 10, the adapter bucket 20 can still accommodate, receive and laterally restrain a conventional, cylindrical paint container 50, with the cylindrical paint container side 54 being tangentially engaged by a number of transversely upstanding protrusions or tabs 29 on the base 28 of the adapter bucket 20. As mentioned above, the preferred pair (or pairs) of the spring clips 40 vertically restrain the cylindrical paint container 50. No lateral shifting of the cylindrical paint container 50 (for balance purposes) is needed since its central geometric axis and center of gravity axis 60 are the same. However, even the regular cylindrically-shaped paint container 50 would have to be similarly shifted if the paint (and thus the center of gravity) were displaced due to the provision of handle cut-outs or other such impingements into the interior of the container.

As mentioned above, the locator cut-out portion 36 on the adapter bucket 20, as shown in FIGS. 10 through 12, provides a visual indication to a user of the proper orientation of the paint container 70, with its handle 84 located adjacent to the locator cut-out portion 36.

As an alternate to the visual indication provided by the locator cut-out portion 36 shown in FIGS. 10 through 12, FIG. 13 illustrates an alternate embodiment of the invention, wherein the adapter bucket 20 includes one or more "dimples" or other such protrusions 96 protruding laterally inwardly from its sides 32. Such protrusions % can thus engage the handle cut-out portions 82 in the paint container 70 in order to provide the user with positive "detent" type of indication that the paint container 70 is properly oriented within the adapter bucket 20.

Those skilled in the art will readily recognize that the present invention has broad utility and wide-ranging application. Alternate embodiments and adaptations of the present invention other than those shown and described herein, as well as variations, modifications and equivalent arrangements, will be apparent from or reasonably suggested by the present invention, as described in the drawings, the foregoing description thereof, and the appended claims, without departing from the substance or scope of the present invention, as defined in the following claims.

What is claimed is:

1. A system for mixing a fluid in a fluid container comprising:

a fluid container selected from a group including a first container having its center of gravity axis coincident with its central geometric axis and a second container having its center of gravity axis offset with respect to its central geometric axis;

a mixing apparatus including a motion axis about which the container is moved by the mixing apparatus; and an adapter mountable on the mixing apparatus for receiving and restraining one of the containers, said adapter including a generally cup-shaped body for receiving said selected container therein, said body including a base through which the motion axis of the mixing apparatus extends when said adapter is mounted on the mixing apparatus and a number of restraining members extending transversely from said base, at least some of said restraining members configured to engage each said selected container and configured to position its center of gravity axis along the motion axis of said mixing apparatus when said selected container is received within said adapter regardless of whether said selected container is said first container or said second container, wherein said first container has a generally circular lateral cross-sectional shape with a generally cylindrical first container side, and said second container has a generally polygonal lateral cross-sectional shape with a number of substantially straight container sides, at least some of said restraining members tangentially engaging said first container when said first container is received within said adapter, and at least some of said restraining members generally flatly engaging said second container when said second container is received within said adapter, at least a pair of said restraining members being laterally spaced apart from said second container when said second container is received within said adapter, an intermediate one of said restraining members interconnecting said pair of spaced apart restraining members and tangentially engaging said second container when said second container is received within said adapter.

2. A system for mixing a fluid in a fluid container according to claim 1, wherein said spaced apart restraining members and said central geometric axis of said second container are on opposite sides of said motion axis when said second container is received within said adapter.

3. A system for mixing a fluid in a fluid container comprising:

a fluid container selected from a group including a first container having its center of gravity axis coincident with its central geometric axis and a second container having its center of gravity axis offset with respect to its central geometric axis;

a mixing apparatus including a motion axis about which the container is moved by the mixing apparatus; and an adapter mountable on the mixing apparatus for receiving and restraining one of the containers, said adapter including a generally cup-shaped body for receiving said selected container therein, said body including a base through which the motion axis of the mixing apparatus extends when said adapter is mounted on the mixing apparatus and a number of restraining members extending transversely from said base, at least some of said restraining members configured to engage each said selected container and configured to position its center of gravity axis along the motion axis of said mixing apparatus when said selected container is received within said adapter regardless of whether said selected container is said first container or said second container, wherein said first container has a generally circular lateral cross-sectional shape with a generally cylindrical first container side, and said second container has a generally square lateral cross-sectional shape with substantially straight second container sides and second container corner portions interconnecting adjacent container sides, at least some of said restraining members tangentially engaging said first container when said first container is received within said adapter, at least some of said restraining members generally flatly engaging said second container when said second container is received within said adapter, and an intermediate one of said restraining members interconnecting said pair of spaced apart restraining members and tangentially engaging a corner portion of said second container when said second container is received within said adapter.

4. A system for mixing a fluid in a fluid container according to claim 3, wherein said intermediate one of said restraining members is a radiused corner of a side portion of said adapter.

5. A system for mixing a fluid in a fluid container according to claim 3, wherein said spaced apart restraining members and said central geometric axis of said second container are on opposite sides of said motion axis when said second container is received within said adapter.

6. A system for mixing a fluid in a fluid container according to claim 3, wherein said second container includes a cut-out handle portion formed in one of said second container corner portions, said intermediate one of said restraining members tangentially engaging a second container corner portion opposite said second container corner portion having said cut-out handle portion formed therein.

7. A system for mixing a fluid in a fluid container according to claim 6, further including a visual alignment indicator in order to indicate to a user a correct orientation for the second container when it is being inserted into the adapter.

8. A system for mixing a fluid in a fluid container according to claim 6, further including at least one registry protrusion protruding inwardly from at least one restraining member, said registry protrusion engaging the cut-out handle portion formed in one of said second container corner portions when the second container is inserted into the adapter.

9. A system for mixing a fluid in a fluid container comprising;

a fluid container selected from a group including a first container having a generally circular lateral cross-sectional shape with a generally cylindrical first container side and having its center of gravity axis coincident with its central geometric axis and a second container having a generally square lateral cross-sectional shape with substantially straight second container sides interconnected by second container corner portions and having its center of gravity axis offset with respect to its central geometric axis;

a mixing apparatus including a rotation axis about which the container is rotated by the mixing apparatus; and an adapter mountable on the mixing apparatus for receiving and restraining one of the containers, said adapter including a generally cup-shaped body for receiving said selected container therein, said body having a generally square lateral cross-sectional shape, including a base through which the rotation axis of the mixing apparatus extends when said adapter is mounted on the mixing apparatus and a number of restraining members extending transversely from said base, at least one of the restraining members configured to engage and laterally restrain said selected container and configured to position its center of gravity axis along said motion axis when said selected container is received within said adapter regardless of whether said selected container is said first container or said second container, wherein four of said restraining members tangentially engage and laterally restrain said first container when said first container is received within said adapter, and a first two other of said restraining members generally flatly engaging and laterally restraining said second container when said second container is received within said adapter, a second two other of said restraining members being spaced apart from said second container when said second container is received within said adapter, an intermediate corner portion interconnecting said spaced apart restraining members and tangentially engaging said second container when said second container is received within said adapter.

10. A system for mixing a fluid in a fluid container according to claim 9, wherein said corner portion is a radiused corner.

11. A system for mixing a fluid in a fluid container according to claim 9, wherein said spaced apart restraining members and said central geometric axis of said second container are on opposite sides of said rotation axis when said second container is received within said adapter.

12. A system for mixing a fluid in a fluid container according to claim 9, further including at least a pair of spring clips mounted on said adapter, said spring clips releasably engaging and vertically restraining at least said first container when said first container is received within said adapter.

13. A system for mixing a fluid in a fluid container comprising:

a fluid container selected from a group including a first container having a generally circular lateral cross-sectional shape with a generally cylindrical first container side and having its center of gravity axis coincident with its central geometric axis and a second container having a generally square lateral cross-sectional shape with substantially straight second container sides interconnected by second container corner portions and having its center of gravity axis offset with respect to its central geometric axis;

a mixing apparatus including a rotation axis about which the container is rotated by the mixing apparatus; and an adapter mountable on the mixing apparatus for receiving and restraining one of the containers, said adapter including a generally cup-shaped body for receiving said selected container therein, said body having a generally square lateral cross-sectional shape, including a base through which the rotation axis of the mixing apparatus extends when said adapter is mounted on the mixing apparatus and a number of restraining members extending transversely from said base, at least one of the restraining members configured to engage and laterally restrain said selected container and configured to position its center of gravity axis alone said motion axis when said selected container is received within said adapter regardless of whether said selected container is said first container or said second container, wherein said second container includes a cut-out handle portion formed in one of said second container corner portions, said restraining members comprising an intermediate adapter corner portion tangentially engaging a second container corner portion opposite said second container corner portion having said cut-out handle portion formed therein.

14. A system for mixing a fluid in a fluid container according to claim 13, further including a visual alignment indicator in order to indicate to a user a correct orientation for the second container when it is being inserted into the adapter.

15. A system for mixing a fluid in a fluid container according to claim 13, further including at least one registry protrusion protruding inwardly from at least one restraining member, said registry protrusion engaging the cut-out handle portion formed in one of said second container corner portions when the second container is inserted into the adapter.

16. A system for mixing a fluid in a fluid container, comprising:

a fluid container selected from a group including a first container having a generally circular lateral cross-sectional shape with a generally cylindrical first container side and having its center of gravity axis coincident with its central geometric axis and a second container having a generally square lateral cross-sectional shape with substantially straight second container sides interconnected by second container corner portions and having its center of gravity axis offset with respect to its central geometric axis;

a mixing apparatus including a rotation axis about which the container is rotated by the mixing apparatus; and an adapter mountable on the mixing apparatus for receiving and restraining one of the containers, said adapter including a generally cup-shaped body for receiving said selected container therein, said body having a generally square lateral cross-sectional shape, including a base through which the rotation axis of the mixing apparatus extends when said adapter is mounted on the mixing apparatus and a number of restraining members extending transversely from said base, said restraining members configured to engage and laterally restrain said selected container and configured to position its center of gravity axis along said motion axis when said selected container is received within said adapter between said adapter sides regardless of whether said selected container is said first container or said second container, at least some of said restraining members tangentially engaging and laterally restraining said first container when said first container is received within said adapter, and a first two other of said restraining members generally flatly engaging and laterally restraining said second container when said second container is received within said adapter, a second two other of said restraining members being spaced apart from said second container when said second container is received within said adapter, an intermediate radiused adapter corner portion interconnecting said spaced apart restraining members and tangentially engaging and laterally restraining one of said second container corner portions when said second container is received within said adapter, said spaced apart restraining members and said central geometric axis of said second container being located on opposite sides of said rotation axis when said second container is received within said adapter.

17. A system for mixing a fluid in a fluid container according to claim 16, said intermediate adapter corner portion tangentially engaging a second container corner portion opposite said second container corner portion having said cut-out handle portion formed therein.

18. A system for mixing a fluid in a fluid container according to claim 16, further including at least a pair of spring clips mounted on said adapter, said spring clips releasably engaging and vertically restraining at least said first container when said first container is received within said adapter.

19. A system for mixing a fluid in a fluid container according to claim 16, wherein said second container includes radiused container corner portions interconnecting adjacent pairs of said second container sides, said adapter including radiused adapter corner portions interconnecting adjacent pairs of some of said restraining members, said intermediate radiused corner portion interconnecting said spaced apart restraining members having a greater radius than that of any of the other of said radiused corner portions.

20. A system for mixing a fluid in a fluid container according to claim 19, wherein said second container includes a cut-out handle portion formed in one of said second container corner portions, said intermediate radiused corner portion interconnecting said spaced apart restraining members tangentially being located to engage and laterally restrain a second container corner portion opposite said second container corner portion having said cut-out handle portion formed therein.

21. A system for mixing a fluid in a fluid container according to claim 20, including a visual alignment indicator in order to indicate to a user a correct orientation for the second container when it is being inserted into the adapter.

22. A system for mixing a fluid in a fluid container according to claim 20, further including at least one registry protrusion thereon, said registry protrusion engaging the cut-out handle portion formed in one of said second container corner portions when the second container is inserted into the adapter.

23. A system for mixing a fluid in a fluid container according to claim 19, wherein said cut-out handle portion includes a handle integrally formed with said second container and spaced laterally apart from a portion thereof, said intermediate radiused corner portion of said adapter being located to engage a second container corner portion opposite said second container handle portion.

24. A system for mixing a fluid in a fluid container comprising:

a fluid container having a generally square lateral cross-sectional shape and having its center of gravity axis offset with respect to its central geometric axis;

a mixing apparatus including a motion axis about which the container is moved by the mixing apparatus; and an adapter mountable on the mixing apparatus for receiving and restraining the fluid container, said adapter including a generally cup-shaped body for receiving said container therein, said body having a base through which the motion axis of the mixing apparatus extends when said adapter is mounted on the mixing apparatus and adapter sides extending transversely from said base, a number of said sides configured to engage said fluid container and configured to position its center of gravity axis along said motion axis when said fluid container is received within said adapter between said adapter sides, wherein said fluid container includes a cut-out handle portion formed therein, said adapter further including at least one registry protrusion protruding inwardly from at least one adapter side, said registry protrusion engaging the cut-out handle portion formed in said fluid container when the second container is inserted into the adapter.

25. A system for mixing a fluid in a fluid container according to claim 24, further including a visual alignment indicator on at least one of said adapter sides in order to indicate to a user a correct orientation for said fluid container when it is being inserted into the adapter.

26. A system for mixing a fluid in a fluid container comprising:

a fluid container having a generally square lateral cross-sectional shape and having its center of gravity axis offset with respect to its central geometric axis;

a mixing apparatus including a motion axis about which the fluid container is moved by the mixing apparatus; and an adapter mountable on the mixing apparatus for receiving and restraining the fluid container, said adapter including a generally cup-shaped body for receiving said container therein, said body having a generally square lateral cross-sectional shape, including a base through which the motion axis of the mixing apparatus extends when said adapter is mounted on the mixing apparatus and adapter sides extending transversely from said base, said sides configured to engage said fluid container and configured to position its center of gravity axis along said motion axis when said fluid container is received within said adapter between said adapter sides, further including at least one registry protrusion protruding inwardly from at least one adapter side, said registry protrusion engaging the cut-out handle portion formed in one of said second container corner portions when the second container is inserted into the adapter.

27. A system for mixing a fluid in a fluid container according to claim 26, further including a visual alignment indicator on at least one of said adapter sides in order to indicate to a user a correct orientation for the second container when it is being inserted into the adapter.

28. A system for mixing a fluid in a fluid container according to claim 26, wherein the mixing apparatus also includes a revolution axis external to said adapter, said adapter being mountable on said mixing apparatus for revolution about said revolution axis.

* * * * *